(12) United States Patent
Klein et al.

(10) Patent No.: US 9,033,849 B2
(45) Date of Patent: May 19, 2015

(54) BACKLASH-FREE PLANETARY GEAR UNIT WITH PLANET CARRIERS PRELOADED RELATIVE TO EACH OTHER

(71) Applicant: MAXON MOTOR AG, Sachseln (CH)

(72) Inventors: Olaf Klein, Emmendingen (DE); Stefan Westholt, Sexau (DE)

(73) Assignee: MAXON MOTOR AG, Sachsein (CH)

( * ) Notice: Subject to any disclaimer, the term of this patent is extended or adjusted under 35 U.S.C. 154(b) by 0 days.

(21) Appl. No.: 14/085,622

(22) Filed: Nov. 20, 2013

(65) Prior Publication Data

US 2014/0148301 A1      May 29, 2014

(30) Foreign Application Priority Data

Nov. 23, 2012    (EP) .................................... 12007907

(51) Int. Cl.
| | |
|---|---|
| F16H 57/08 | (2006.01) |
| F16H 57/12 | (2006.01) |
| F16H 1/28 | (2006.01) |
| F16H 55/18 | (2006.01) |

(52) U.S. Cl.
CPC ............. *F16H 57/12* (2013.01); *F16H 57/082* (2013.01); *F16H 1/2863* (2013.01); *F16H 55/18* (2013.01)

(58) Field of Classification Search
None
See application file for complete search history.

(56) References Cited

U.S. PATENT DOCUMENTS

| | | | |
|---|---|---|---|
| 6,148,684 A | 11/2000 | Gardiner | |
| 2006/0142114 A1* | 6/2006 | Fox | 475/348 |
| 2007/0093354 A1 | 4/2007 | Berger | |
| 2008/0032850 A1* | 2/2008 | Ishizuka | 475/331 |
| 2008/0194378 A1* | 8/2008 | Fox | 475/347 |
| 2010/0240490 A1 | 9/2010 | Schafer | |

FOREIGN PATENT DOCUMENTS

| | | |
|---|---|---|
| DE | 102008011147 A1 | 10/2009 |
| EP | 0505140 A1 | 9/1992 |
| EP | 1034923 A1 | 9/2000 |
| EP | 1813504 A1 | 8/2007 |
| JP | H03048045 A | 3/1991 |
| JP | H08170695 A | 2/1996 |
| WO | 2013083188 | 6/2013 |

OTHER PUBLICATIONS

EP Appl. No. 12007907.4, European Search Report dated May 3, 2013, 6 pgs.

* cited by examiner

*Primary Examiner* — Justin Holmes
*Assistant Examiner* — Timothy Hannon
(74) *Attorney, Agent, or Firm* — Dickinson Wright PLLC

(57) ABSTRACT

The invention relates to a backlash-free planetary gear unit with a sun gear and with a ring gear, which mesh with at least one first planet gear of a planetary stage, wherein the planetary stage comprises a first planet carrier on which the first planet gear is rotatably mounted, wherein there is furthermore at least one second planet gear in the planetary stage that also meshes with the ring gear and the sun gear, wherein the at least one second planet gear is rotatably supported at a second planet carrier of the planetary stage, wherein the two planet carriers are in the circumferential direction of the sun gear preloaded relative to each another such that also the at least one first planet gear is preloaded relative to the at least one second planet gear in the circumferential direction of the sun gear.

18 Claims, 2 Drawing Sheets

BACKLASH-FREE PLANETARY GEAR UNIT WITH PLANET CARRIERS PRELOADED RELATIVE TO EACH OTHER

This application claims benefit of the filing date of EP12007907.4, filed Nov. 23, 2012, the entire contents of which is incorporated herein by reference for all purposes.

BACKGROUND

1. Field

The invention relates to a backlash-free planetary gear unit with a sun gear and with a ring gear which mesh with at least one first planet gear of a planetary stage wherein the first planetary stage comprises a first planet carrier on which the first planet gear is rotatably mounted, wherein there is furthermore at least one second planet gear in the planetary stage that also meshes with the ring gear and the sun gear.

2. Description of Related Art

In the field of high-precision planetary gear units, elimination of gear backlash between the gears transmitting the torque is considered an important objective. Therefore, planetary gear units are already know from prior art in which planet gears are divided and these planet gear halves are preloaded relative to each other.

Such a planetary gear unit is known, for example, from DE 10 2008 011 147 A1 In this gear unit, two planet gear halves are arranged on at least one planetary axis of rotation of a planet carrier and are preloaded relative to each other by a plurality of spring bars. This embodiment, however, requires forming separate recesses in the two planet gear halves for preloading in order to attach the spring bars to the planet gear halves. Firstly, this leads to weakening the planet gear geometry, and secondly, to a high production effort due to the machining the commonly high-strength steel gear. Moreover, under aspects of production technology, it is for reasons of space only possible to fabricate these recesses up to a certain planet gear diameter and therefore to a certain size of the planetary gear unit. For small models, it is technically no longer possible to attach such recesses

SUMMARY

It is therefore the object of the present invention to provide a preloading mechanism for small-sized planetary gear units to eliminate gear backlash while avoiding additional processing of the planet gears.

This object is satisfied according to the invention, in that the at least one second planet gear is rotatably supported on a second planet carrier of the planetary stage, wherein the two planet carriers are in the circumferential direction of the sun gear preloaded relative to each another such that also the at least one first planet gear is preloaded relative to the at least one second planet gear in the circumferential direction of the sun gear.

This has the effect that the planet gears of the planetary gear unit need not be separately processed in order to effect preloading. The processing effort, especially for small gear units, is thereby significantly reduced. By attaching the preloading mechanism to the two planet carriers, it is also advantageous that merely the less hard material of the planet carrier needs to be processed, rather than the high-strength gear steel. It is also advantageous when using two planet carriers, that the planet carriers can be adjusted relative to each other. If the elements providing the preload have reached a certain wear limit, the resulting loss of preload can be corrected by adjusting the position of the planet carriers relative to each other. Due to this readjustment, which is also possible in the assembled state of the gear unit, the lifetime of the preloading elements can be significantly extended.

Advantageous embodiments are claimed in the dependent claims and shall be explained below.

According to an advantageous embodiment of the invention, the outer diameter of the assembled planetary gear unit can be less than 40 mm, preferably less than 32, more preferably less than 22 mm. Highly efficient preloading of the planet gears is thereby possible.

According to a further advantageous embodiment of the invention, the first planet carrier can also be designed as a component which is separate from the second planet carrier and the two planet carriers can be rotatable about a common axis, preferably about the axis of rotation of the sun gear. This considerably simplifies assembly and re-adjustment of the preloading force in the assembled state. A space-saving design of the planetary gear unit and a simple design of the preloading elements are possible.

Furthermore, it is advantageous if, according to a further advantageous embodiment of the invention, at least one spring element is provided extending between the first and the second planet carrier for preloading the first planet carrier relative to the second planet carrier. Due to the configuration as a spring element, there is resilient preloading provided to cushion the load peaks.

If this spring element, according to an advantageous embodiment of the invention, comprises a first end being formed as one piece integrally on the first planet carrier, then it is possible to design a planet carrier integrally with the spring elements, thereby reducing the complexity of the components.

If, according to a further advantageous embodiment of the invention, the at least one spring element on the first and/or the second planet carrier is supported, preferably in a recess, than the points for introducing the preload forces at the planet carrier are clearly defined and the spring elements are also held in a lateral direction perpendicular to the axis of rotation of the sun gear.

Furthermore, according to an advantageous embodiment of the invention, the at least one spring element can comprise a second, bar-shaped end, which is by a positive fit connection held in the recess, preferably designed as a bore, of the second planet carrier, wherein preferably one opening of the bore, through which the spring element is inserted into the positive fit connection, faces the first planet carrier. A cost-effective embodiment of the support of the spring element is thereby made possible, whereby the spring element can further be clamped between the planet carriers in a space-saving manner.

According to an advantageous embodiment of the invention, the diameter of the bore of the second planet carrier can be widened at at least a first increment towards the first planet carrier. Due to this widening of the bore, the spring element can deform already within the bore, whereby larger bending radii of the spring element are possible.

If the bar-shaped end of the spring element is according to a further advantageous embodiment of the invention supported at the end face of a second increment adjoining to the positive-fit connection, then the position of the spring element is secured in the axial direction, i.e. in the direction of the axis of rotation of the sun gear.

According to an advantageous embodiment of the invention, the recess can connect to a vent. As a result, overpressure in the bore is avoided after the spring element has been inserted into the positive-fit connection. Such a vent can be enabled, for example, by a through bore-hole.

If, in a further advantageous embodiment of the invention, the number of planet gears being arranged at the first planet carrier corresponds to the number of planet gears mounted at the second planet carrier, wherein the number of spring elements preferably corresponds to the number of planet gears mounted in the first planet carrier, then one planet gear pair each can be formed, to which a separate spring element is assigned, in order to distribute the preload uniformly around the circumference of the planet carrier.

If, according to an embodiment of the invention, the planetary gear unit comprises either exactly three spring elements, exactly three first and exactly three second planet gears, or exactly four spring elements, exactly four first and exactly four second planet gears, then a particularly stable embodiment of the planetary gear unit is possible.

In a further embodiment according to the invention, at least one spring element can be constructed as a spring bar extending linearly in the untensioned state and comprising a constant circular cross-section along its length. By using spring bars, inexpensive preloading of the planet carriers relative to each other can be enabled.

The planet gears of the first planet carrier and the second planet carrier can according to a further advantageous embodiment of the invention be preloaded relative to each other by their bearing against the sun gear and the ring gear. This reduces the complexity of the preloading mechanism used for the backlash-free construction.

In a further advantageous embodiment of the invention, in the preloaded state, tooth flanks of the at least one planet gear disposed at the first planet carrier bear against a first side of tooth flanks of the ring gear and a first side of tooth flanks of the sun gear, and tooth flanks of the at least one planet gear disposed at the second planet carrier bear against a second side of the tooth flanks of the ring gear and the sun gear which is disposed opposite to the first side of the tooth flanks of the sun and ring gear. The corresponding counterforce to the preload is thereby enabled in an uncomplicated manner.

According to an advantageous embodiment of the invention, at least one spring element can with adhesive or a press fit be attached preferably on a face side to at least one of the first and the second planet carriers. Additional fixation of the spring elements in the planet carriers, as the recesses, is thereby ensured in a simple manner.

If, according to a further advantageous embodiment of the invention, the at least one spring element extends outside of the planet gears of the first and/or second planet carrier between the planet carriers, then the design of the planet gears is unaffected by the spring elements. In addition, a linear connection between the planet carriers can be implemented reducing the space requirement for the spring elements.

In an advantageous embodiment of the invention, the first planet carrier can be connected to the second planet carrier. Re-adjustability between these two planet carriers is thereby ensured in a particularly simple manner.

If, according to an advantageous embodiment of the invention, the plurality of spring elements is arranged at the same angular distance to each other about the axis of rotation of the first and/or second planet carrier, then uniform distribution of the spring elements around the circumference of the planet carrier is ensured, and thereby uniform distribution of forces to the spring bars.

In particular, if, in a further advantageous embodiment of the invention, each of the spring elements is arranged at an angle of 40-50°, preferably 44° offset to the axis of rotation of the planet gears of the first and/or second planet carrier at the first and at the second planet carrier, then this uniform distribution of forces is accomplished in a particularly simple manner.

If, according to an advantageous embodiment of the invention, the material of which the at least one spring element is made is spring steel, hard metal or metallic glass, then it is possible to provide a highly durable and elastic preloading mechanism of high strength.

If the sun gear is according to a further advantageous embodiment of the invention made of chrome-molybdenum steel and preferably hardened and/or nitrocarburized, then the sun gear has a particularly high resistance to wear.

If the planetary gear unit according to an embodiment of the invention additionally comprises multiple preloaded planetary stages, then it is possible to switch even more complex gear units with a plurality of different gears in a backlash-free mode.

The invention is explained below by means of the embodiments using the figures in a drawing.

DETAILED DESCRIPTION OF THE SPECIFIC EMBODIMENTS

Figure 1:
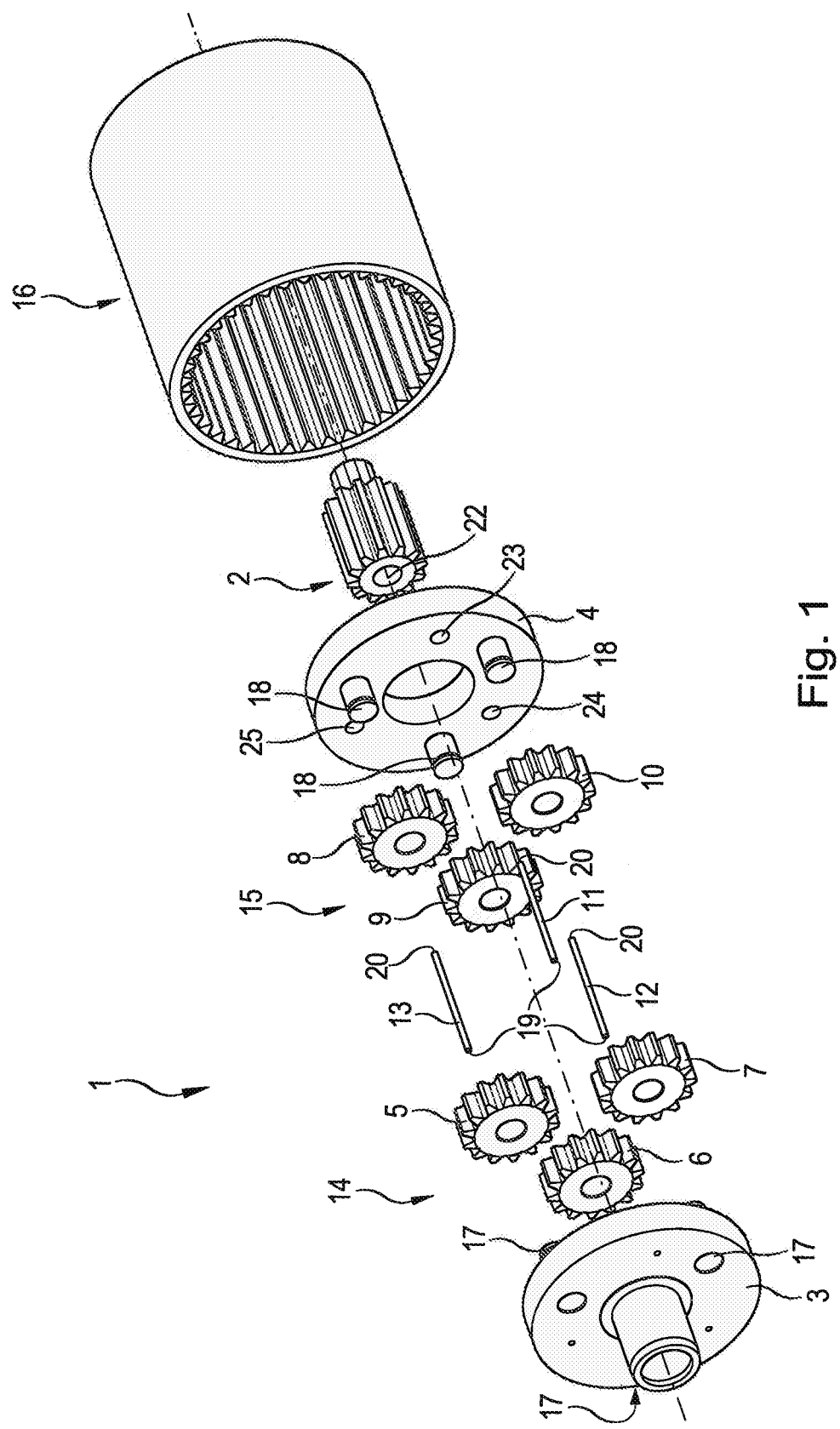
FIG. 1 shows an exploded view of the backlash-free planetary gear unit of the invention in an isometric view.

The figures are merely schematic in nature and serve only to understand the invention. Same elements are denoted with the same reference numerals.

FIG. 1 shows a planetary gear unit 1 according to the invention with a centrally arranged sun gear 2 that is rotatably mounted on a central axis of rotation 22. The teeth of the sun gear 2 extending parallel to this axis of rotation are operatively meshing with the planet gears 5, 6, 7, 8, 9, 10. A ring gear 16 is in turn operatively meshing with these planet gears 5, 6, 7, 8, 9 and 10, which are carried by the planet carriers 3, 4.

For receiving three planet gears 5, 6, 7, a first planet carrier 3 comprises three pin elements 17, where a planet gear 5, 6 or 7 is mounted on each of the pin elements 17 rotatable about a planetary axis of rotation. The pin elements 17 are disposed at the first planet carrier 3 such that the mounted planet gears 5, 6, 7 are with their planetary axis of rotation aligned parallel to the central axis of rotation 22 of the sun gear 2. The pin elements 17 are arranged equidistant along a first circumferential line 26 at the first planet carrier 3, so that the angular distance between the axes of rotation of adjacent planet gears 5, 6, 7 is 120°. These angular distances are particularly well visible in FIG. 2. The first planet carrier 3 is also mounted rotatable about the central axis of rotation 22 of the sun gear 2.

In the direction of the planet gears 5, 6, 7, which are all arranged on the same side of the planet carrier 3, a second planet carrier 4 is positioned again comprising three planet gears 8, 9 and 10, where the planet gears 5, 6, 7 are arranged on the side of the planet carrier 3 facing the second planet carrier 4. These three planet gears 8, 9 and 10 of the second planet carrier 4 are arranged at the second planet carrier 4 in a manner similar to the planet gears 5, 6, 7 at the first planet carrier 3. Also the second planet carrier 4 comprises three pin elements 18, which again serve to receive the three planet gears 8, 9, 10, and support each planet gear 8, 9 or 10 on a planetary axis of rotation that is parallel to the central axis of rotation axis 22 of the sun gear 2. Also the planet gears 8, 9 and 10 of the second planet gear set 15 are arranged at the same angular distances at the second planet carrier 4, namely along a circumferential line offset by 120°. The planet gears 8, 9, 10 of the second planet carrier 4 are also arranged on one side of the planet carrier 4 in such a manner that the side of the planet carriers 3 and 4 receiving the planet gears 5, 6, 7 and 8, 9, 10 are facing each other. The second planet carrier 4 is likewise mounted rotatable about the central axis of rotation 22 of the sun gear 2. As can be seen from FIG. 1, the two planet carriers 3, 4, are designed as two different components separated from one another. The first planet carrier 3 is turned to the second planet carrier 4 such that the planetary axes of rotation of the planet gears 5, 6, 7 run of the first planet carrier 3 extend substantially coaxially to the planetary axes of rotation of the planet gears 8, 9, 10 of the second planet carrier 4, 4. The three planet gears 5, 6 and 7 of the first planet carrier 3 form a first planet gear set 14 and the three planet gears 8, 9, 10 of the second planet carrier 15 a second planet gear set 15.

Three spring elements 11, 12, 13 are present for preloading the two planet carriers 3 and 4 relative to each other and thereby the planet gears 5, 6, 7 mounted thereupon of the first planet carrier 3 to the planet gears 8, 9, 10 of the other second planet carrier 4. These spring elements 11, 12, 13 are formed as spring bars. In the untensioned state, the spring bars extend linearly and comprise a circular cross-section.

The first planet carrier 3 and the spring elements 11, 12, 13 are integrally formed. A first end 19 of the spring elements 11, 12, 13 facing the first planet carrier 3 is on the face side formed onto the first planet carrier in order to form the spring elements 11, 12, 13 integrally with the first planet carrier 3. In the untensioned state, the three spring elements 11, 12, 13 extend substantially parallel to the central axis of rotation 22 of the sun gear 2

The second end 20 disposed opposite to the first end 19 of the spring elements 11, 12, 13 is supported on the second planet carrier 4. For this, a recess 23, 24, 25 shaped as a bore is provided for each spring element 11, 12, 13 and again extends essentially parallel to the axis of rotation 22 of the sun gear 2.

Figure 2:
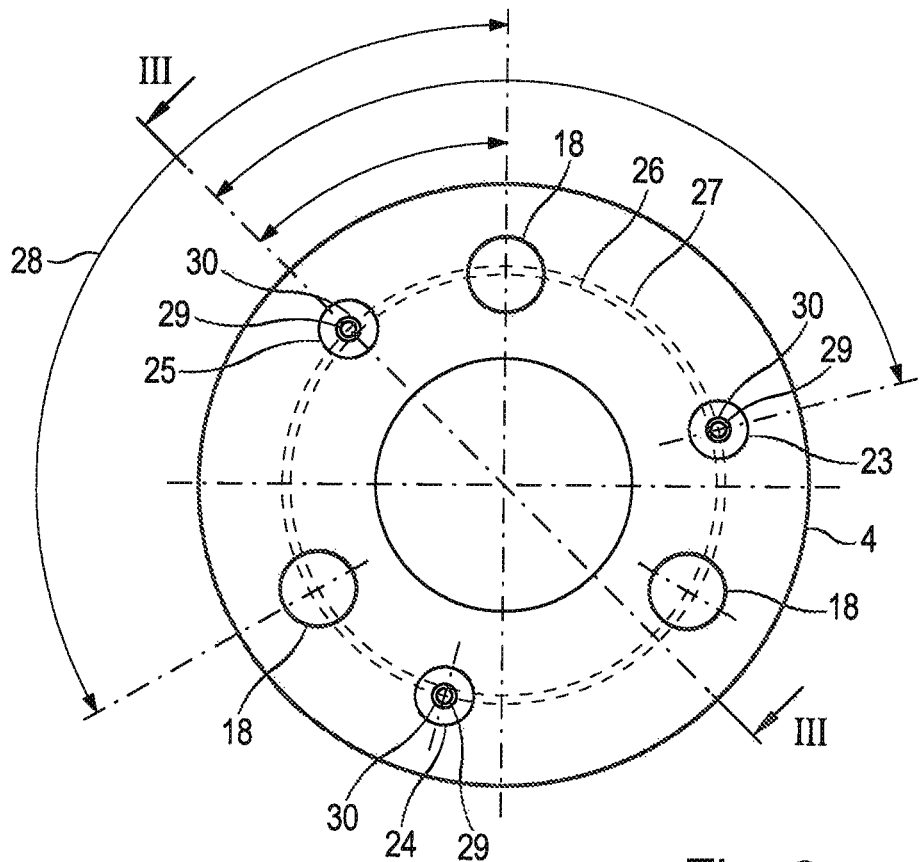
FIG. 2 shows a front view of a planet carrier of the invention in a plane perpendicular to the axis of rotation of the sun gear.
Figure 3:
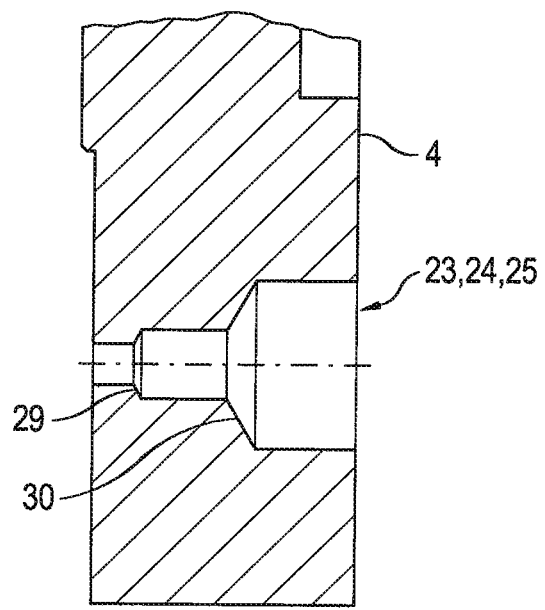
FIG. 3 shows a sectional view taken along the line shown in FIG. 2 in the region of a recess for receiving a spring element.

More details on these recesses 23, 24, 25 can be gathered from FIGS. 2 and 3. FIG. 3 discloses that the bore of each recess is multi-incremental, presently being designed with two increments. A through bore-hole is introduced into the second planet carrier 4 with a first diameter at a diameter smaller than the diameter of the second bar-like end 20 of the spring element 11, 12, 13. This through bore-hole extends substantially parallel to the axis of rotation 22 of the sun gear 2 and is drilled wider from a first increment 29 to a bore diameter having a second, larger diameter. This second diameter has the same diameter as the second end 20 of the respective spring element 11, 12, 13, so that a positive fit connection of the respective spring element 11, 12, 13 is formed at this second bore diameter. A press-fit connection can optionally also be provided. That first increment 29 formed between the first and the second diameter serves to support the face side of the second end 20 of the respective spring element 11, 12, 13. Furthermore, the bore comprise a second increment 30, where the bore diameter is widened a second time to a third diameter, where this is the largest diameter and is selected such that there is clearance for each of the spring elements 11, 12, 13 in the section of the third diameter.

At the first increment 29 on which the face-side second end 20 of spring element 11, 12, 13, is supported, adhesive is preferably applied during assembly of the spring element 11, 12, 13 to fasten the face side of the spring element 11, 12, 13 by additional bonding force to the first increment 29. The through bore-hole extending through the planet carrier 4 serves ventilation to enable both pressure equalization with the ambient air when assembling the face-side second end 20 of spring element 11, 12, 13 and the planet carrier 4, as well as optimal curing of the adhesive applied in the area of the first increment 29.

As is particularly well visible in FIG. 2, the recesses 23, 24, 25 embodied as bores for receiving the second end 30 of the spring elements 11, 12, 13 are also arranged at an equal angular distance around a second circumferential line 27 of the planet carrier 4. The distance between the individual longitudinal axes of the recesses 23, 24, 25 relative to each other is presently 120°. As is furthermore also apparent, the circumferential circle 26, on which the planetary axes of rotation of the planet gears 8, 9, 10 are arranged, is concentric with the circumferential circle 27, on which the longitudinal axes of the recesses 23, 24, 25 are arranged, where the circumferential circle 27 has a larger diameter than the circumferential circle 26. Each recess 23, 24, 25 is arranged between two adjacent pin elements 18 such that the angular distance between the longitudinal axes of the individual recesses 23, 24, 25 and the pin elements 18 of the planet gears 8, 9, 10 lies between 40 and 50°, preferably between 43 and 45°, preferably at 44°. In this embodiment, the angular distance is 44°.

The design of the planetary gear unit 1 has been optimized for small gears, the outer diameter of which, specifically the outer diameter of the ring gear, is less than 40, does not exceed preferably 32, preferably 22, preferably 16, preferably 13, preferably 6 mm.

The planetary gear unit 1 is designed as a backlash-free planetary gear unit 1 in which the backlash in the planetary gear unit 1 is almost entirely or entirely eliminated by preloading at least two planet gears 5 to 10 relative to each other, where the at least two planet gears 5 to 10 bear against the sun gear 2 and the ring gear 16. The two planet gears 5 to 10 are presently oppositely preloaded in the circumferential direction of the planet gears 5 to 10.

In the preloaded and assembled state, the planet gears 5, 6, 7 arranged in the first planet carrier 3 bear with tooth flanks against a first side of tooth flanks of the ring gear 16 and a first side of tooth flanks of the sun gear 2. At the same time, tooth flanks of the planet gears 8, 9, 10 arranged at the second planet carrier 4 bear against a second side of the tooth flanks of the ring gear 16 and the sun gear 2 located opposite to the first side of the tooth flanks of the sun and ring gear 2, 16.

In the present embodiment illustrated in FIG. 1, the planet gears 5, 6, 7 engage with the sun gear 2 and the ring gear 16 and also the planet gears 8, 9, 10 of the second planet gear set 15 with the sun gear 2 and the ring gear 16.

As an alternative to the integrally formed embodiment of the first planet carrier 3 with the spring elements 11, 12, 13 described in connection with FIG. 1, the spring elements 11, 12, and 13 can also be formed separately from the first planet carrier 3. Each first end 11 of the three spring elements 11, 12, 13 can be supported in a further recess of the first planet carrier 3. In this case, the recesses are embodied the same as the recesses 23, 24, 25 previously described of the second planet carrier 4 and the first ends 19 of the spring elements 11, 12, 13 are attached in the first planet carrier 3 like the second ends 20 in the second planet carrier 4. It is also possible to attach the first and/or second ends 19, 20 of the spring elements 11, 12, 13 in another manner to one to the planet carriers, for example by a screw connection of one end to an internal thread of the respective planet carrier 3, 4.

The spring elements 11, 12, 13 designed as spring bars are for optimum force transfer made of spring steel. In order to increase the mechanical strength, the spring elements 11, 12, 13, however, can also be made of a hard metal or metallic glass material.

The sun gear 2, which must withstand high wear and tear forces, is made of chrome-molybdenum steel that is hardened and/or nitrocarburized.

In addition to the first planetary stage illustrated, it is also possible to integrate further planetary stages into the planetary gear unit 1, which are also preferably preloaded.

In a further embodiment, which is not shown in the drawing, it is also possible to use four planet gears for each planet carrier 3, 4, where the angular distance between the planetary axes of rotation of adjacent planet gears is essentially 90°. In one embodiment with four planet gears for each first and second planet carrier 3, 4, there are four spring elements provided engaging offset to each by 90° with the two planet carriers 3, 4. The four planet gears of each planet carrier 3, 4 and the four spring elements are designed and support in the same manner as the three planet gears 5-10 of each planet carrier 3 previously described. There is consequently one spring element anchored in the respective planet carrier 3, 4 between two adjacent planet gears of a planet carrier 3, 4.

To assemble the planetary gear unit 1 and preload the planet carriers 3, 4 as well as their planet gears 5 to 10 relative to each other, each of the planet gears 5 to 10 is first fitted onto a pin element 17, 18. Subsequently, the spring elements 11, 12, 13 of the first planet carrier 3 are inserted into the recesses 23, 24, 25 of the second planet carrier 4. The sun gear 2 and the ring gear 16 are then brought into engagement with the planet gears 5 to 10 the two planet carriers 3 and 4. First, the first planet gear set 14 is brought into operative engagement with the sun gear 2 and ring gear 16, then a certain torque is applied to the second planet carrier 4 to turn the second planet carrier 4 relative to the first planet carrier 3, to deform the spring elements 11, 12, 13 and to thereby ensure preloading. When the teeth of the first planet gear set 14 are in alignment with those of the second planet gear set 15, the second planet gear set 15 can also be pushed onto the teeth of the ring gear 16 and the sun gear 2 to thereby also mesh with these two gears 2, 16.

The invention claimed is:

1. A backlash-free planetary gear unit with a sun gear and with a ring gear which mesh with at least one first planet gear of a planetary stage, wherein said planetary stage comprises a first planet carrier on which said first planet gear is rotatably mounted, wherein there is furthermore at least one second planet gear in the planetary stage that also meshes with said ring gear and said sun gear wherein said at least one second planet gear is rotatably supported at a second planet carrier of said planetary stage, wherein said first planet gear and said second planet gear are arranged between said first planet carrier and said second planet carrier, and said first planet carrier and said second planet carrier are in the circumferential direction of said sun gear preloaded relative to each other by at least one preloading element, such that said at least one first planet gear is preloaded relative to said at least one second planet gear in the circumferential direction of said sun gear.

2. The planetary gear unit according to claim 1, wherein in an assembled state of said planetary gear unit, an outer diameter of said planetary gear unit is less than 40 mm.

3. The planetary gear unit according to claim 2, wherein said outer diameter is less than 32 mm.

4. The planetary gear unit according to claim 3, wherein said outer diameter is less than 22 mm.

5. The planetary gear unit according to claim 1, wherein said first planet carrier is designed as a component which is separate from said second planet carrier and the two planet carriers are rotatable about a common axis.

6. The planetary gear unit according to claim 5, wherein said common axis is a axis of rotation of said sun gear.

7. The planetary gear unit according to claim 1, wherein said preloading element is at least one spring element extending between said first and second planet carrier for preloading said first planet carrier relative to said second planet carrier.

8. The planetary gear unit according to claim 7, wherein said spring element comprises a first end formed integrally onto said first planet carrier.

9. The planetary gear unit according to claim 8, wherein said at least one spring element is supported in a recess of at least one of said first planet carrier and said second planet carrier.

10. The planetary gear unit according to claim 9, wherein said spring element comprises a second, bar-shaped end, which is by a positive-fit connection held in said recess being designed as a bore of said second planet carrier, wherein said spring element is inserted through an opening of said bore into said bore.

11. The planetary gear unit according to claim 10, wherein said bore of said second planet carrier includes at least one flared section towards said first planet carrier, wherein a diameter of said flared section is larger than a diameter of said bore of said second planet carrier.

12. The planetary gear unit according to claim 10, wherein said bar-shaped end of said spring element is supported on an end face of said bar-shaped end at a second flared section adjoining said positive-fit connection.

13. The planetary gear unit according to claim 9, wherein said recess is connected to a vent.

14. The planetary gear unit according to claim 7, wherein a number of planet gears being mounted at said first planet carrier corresponds to a number of planet gears mounted at said second planet carrier, wherein a number of spring elements corresponds to the number of planet gears arranged at said first planet carrier.

15. The planetary gear unit according to claim 14, wherein said planetary gear unit comprises exactly three spring elements, exactly three first and exactly three second planet gears.

16. The planetary gear unit according to claim 7, wherein said one spring element is formed as a spring bar extending linearly in the untensioned state and comprising a constant circular cross-section along a length of said spring bar.

17. The planetary gear unit according to claim 1, wherein said first planet gears of said first planet carrier and said second planet gears of said second planet carrier are preloaded by said preloading element relative to each other by bearing against said sun gear and said ring gear.

18. The planetary gear unit according to claim 17, wherein, in the preloaded state, tooth flanks of said at least one planet gear disposed at said first planet carrier bear against a first side of tooth flanks of said ring gear and a first side of tooth flanks of said sun gear, and tooth flanks of said at least one planet gear disposed at said second planet carrier bear against a second side of said tooth flanks of said ring gear and the sun gear which is disposed opposite to said first side of said tooth flanks of said sun gear and said ring gear.

\* \* \* \* \*